United States Patent [19]

Brown et al.

[11] Patent Number: 4,791,341

[45] Date of Patent: Dec. 13, 1988

[54] SPEED REDUCING CONTROL SYSTEM FOR A POLYPHASE ELECTRIC MOTOR

[75] Inventors: Herbert J. Brown; Thomas D. Stitt, both of Erie, Pa.

[73] Assignee: General Electric Company, Erie, Pa.

[21] Appl. No.: 145,064

[22] Filed: Jan. 19, 1988

[51] Int. Cl.[4] .............................................. A02P 5/40
[52] U.S. Cl. .............................. 318/809; 318/345 CB; 318/812
[58] Field of Search ................. 318/809, 812, 345 CB, 318/345 D, 345 G

[56] References Cited

U.S. PATENT DOCUMENTS

| | | | |
|---|---|---|---|
| 3,908,158 | 4/1975 | Studtmann | 318/227 |
| 4,176,306 | 7/1979 | Asano et al. | 318/772 |
| 4,461,985 | 5/1984 | Stitt | 318/727 |
| 4,524,316 | 10/1985 | Brown et al. | 318/809 |
| 4,713,744 | 12/1987 | Coston | 363/160 |

OTHER PUBLICATIONS

"Low-Cost Electric Speed Controller for Small Induction Motors" by W. Matley et al., IEE Power Div. Conf. Publ. 179, pages 42–45 (Sept. 1979).

Primary Examiner—David Smith, Jr.
Attorney, Agent, or Firm—Albert S. Richardson, Jr.

[57] ABSTRACT

A variable speed 3-phase a-c motor is connected to a 3-phase source of alternating voltage via a plurality of controllable solid state electric valves which are so arranged and controlled that motor speed can be reduced by skipping selected cycles of the source voltage. For half speed operation 12 valves are arranged to interconnect the source and motor phases, and over two consecutive periods of the source voltage six separate, uniformly spaced "firing windows" are selected during which the conducting states of different pairs of these valves are initiated in a predetermined pattern that results, in each phase of the motor, in a double-pulse current waveform having one-half the fundamental frequency of the source voltage.

13 Claims, 6 Drawing Sheets

SPEED REDUCING CONTROL SYSTEM FOR A POLYPHASE ELECTRIC MOTOR

BACKGROUND OF THE INVENTION

This invention relates to drive systems for variable speed alternating current (a-c) electric motors, and more particularly it relates to a "cycle-skipping" kind of motor speed control system.

This invention is an improvement of the cycle-skipping speed control system that is disclosed and claimed in U.S. Pat. No. 4,461,985 granted to Thomas D. Stitt on July 24, 1984, and assigned to General Electric Company, which patent is expressly incorporated herein by reference. According to the teachings of the referenced Stitt patent, a variable speed 3-phase a-c motor is connected to a 3-phase source of alternating voltage via five controllable bidirectional solid state switches each of which preferably comprises a pair of silicon controlled rectifiers or thyristors interconnected in inverse-parallel relationship with one another. The respective switches are so arranged and controlled that motor speed can be reduced by skipping selected cycles of the source voltage. For example, for half speed operation three of the switches are arranged respectively to connect phases A, B and C of the source to phases A, C and B of the motor, and over two consecutive periods of the source voltage three separate, uniformly spaced "firing windows" are selected during which the conducting states of these switches are initiated in a predetermined pattern that results in the phase A-to-phase B source voltage being applied to the motor during the first window, the phase C-to-phase A source voltage being applied during the next window, and the phase B-to-phase C source voltage being applied during the last window. Consequently the fundamental frequency of the output voltage is one-half the fundamental frequency (f) of the source voltage, and the running speed of the motor will be correspondingly reduced compared to full speed.

According to U.S. Pat. No. 4,524,316 granted jointly to Herbert J. Brown and T. D. Stitt on June 18, 1985 and assigned to General Electric Company, when the cycle-skipping system of Stitt is operating at a fraction of full speed, the magnitude-to-frequency ratio of motor voltage is maintained substantially the same as at full speed by varying the "firing angle" at which the switches start conducting current so as to minimize any deviation of the rms magnitude of the motor voltage from the product of the rms magnitude (v) of source voltage times said fraction.

The system disclosed in the prior Stitt and Brown et al patents has operated successfully in a practical application where the source frequency (f) is variable and v varies with f. Nevertheless, at reduced speed and with f in a certain below-maximum frequency range, the output current waveform of this cycle-skipping system has exhibited a relatively poor form factor and a second harmonic component of undesirably high amplitude.

SUMMARY OF THE INVENTION

A general objective of the present invention is to provide an improved cycle-skipping polyphase motor speed control system that operates at a given fraction of full speed with fewer losses and higher efficiency than the prior art system.

Another object is to provide such a system characterized by an output current waveform that will have virtually no second harmonic component whenever the system operates at one-half of full speed.

Yet another object is to provide a cycle-skipping polyphase motor speed reducing control system, the output current waveform of which is characterized by an improved form factor without risking current "shoot through."

In carrying out the invention in one form, the three phases of a 3-phase source of alternating voltage of variable fundamental frequency (f) are respectively connected to corresponding phases of a 3-phase a-c motor by means of controllable bidirectional switches, two of the source and motor phases (e.g., phases B and C) are cross-connected via two additional switches of the same kind, the other source phase (e.g., phase A) is separately connected to the aforesaid cross-connectd motor phases via two controllable unidirectional solid state valves or switches (e.g., silicon controlled rectifiers or thyristors), respectively, and the other motor phase (e.g., phase A) is separately connected to the aforesaid cross-connected source phases by means of two more controllable unidirectional switches, respectively. Each bidirectional switch has a non-conducting state, a positive conducting state in which motor current flows through the switch in one direction, and a negative conducting state in which motor current flows through the switch in the opposite direction. Each unidirectional switch has alternative conducting and non-conducting states and motor current can flow through it, when conducting, in only the direction in which the switch is poled. The conducting states of the switches are selectively initiated by periodic firing signals that are cyclically produced by associated control means. The control means is supplied with a speed command signal which indicates whether full motor speed or a fraction 1/N of full motor speed is desired (e.g., N is 2 for half speed or 4 for quarter speed), and it is also supplied with a train of timing pulses synchronized with zero-crossings of the phase-to-phase source voltage.

The control means is arranged to produce, when full speed is desired, a family of six firing signals that are synchronized with the aforesaid timing pulses and that respectively commence in a predetermined sequence at approximately 1/6f intervals. In accordance with the present invention, the control means is further arranged when one-half full speed is desired: (1) to predetermine a particular family and pattern of six different pairs of firing signals, (2) to establish a series of recurrent periods synchronized with the timing pulses, each period having a duration of approximately 2/f, (3) to preselect six separate "windows" in each of said periods during which firing signals can be produced, with only one pair of firing signals being permitted during any one of these windows, and (4) to produce in turn, during succeeding windows in each period, the predetermined pairs of firing signals, whereby each firing signal in the family is produced at a frequency of one-half f Hertz. Assuming a conventional A-B-C phase rotation, the firing windows are so selected that the conducting states of the respective switches will be initiated in a pattern that results !n the phase A-to-phase B source voltage being applied across the motor phases A and C during the first window, the phase B-to-phase C source voltage being applied across the motor phases B and C during the second window, the C-to-A source voltage being applied across the motor phases B and A during the third window, the A-to-B source voltage being applied across the motor phases C and A during the fourth window, the B-to-C source voltage being applied across the motor phases C and B during the fifth window, and the C-to-A source voltage being applied across the motor phases A and B during the last window. Consequently the current in each phase of the motor will comprise two consecutive discrete pulses of positive current and two consecutive discrete pulses of negative current, with the respective pairs of positive and negative pulses being separated from one another by appreciable intervals of zero current. This double-pulse current waveform has a fundamental frequency that is one-half f, and it has virtually no second harmonic component. Furthermore, if compared to the speed reducing control system disclosed in the referenced Stitt patent when operating in a half-speed mode at the same fundamental frequency and the same electrical power output, each current pulse has a significantly lower peak magnitude, whereby the present system and its connected load will have lower electrical losses and higher efficiency.

In another aspect of this invention, means responsive to motor current is provided to prevent the aforesaid firing signals from actually commencing when motor current is detected, thereby ensuring that the first current pulse in each set of double pulses decays to zero before the second pulse in the same set begins. This will avoid any possible overlap of consecutive pulses that would otherwise cause an undesirable current short circuit or "shoot through" of the source.

The invention will be better understood and its various objects and advantages will be more fully appreciated from the following description taken in conjunction with the accompanying drawings.

DETAILED DESCRIPTION OF THE INVENTION

Figure 1:
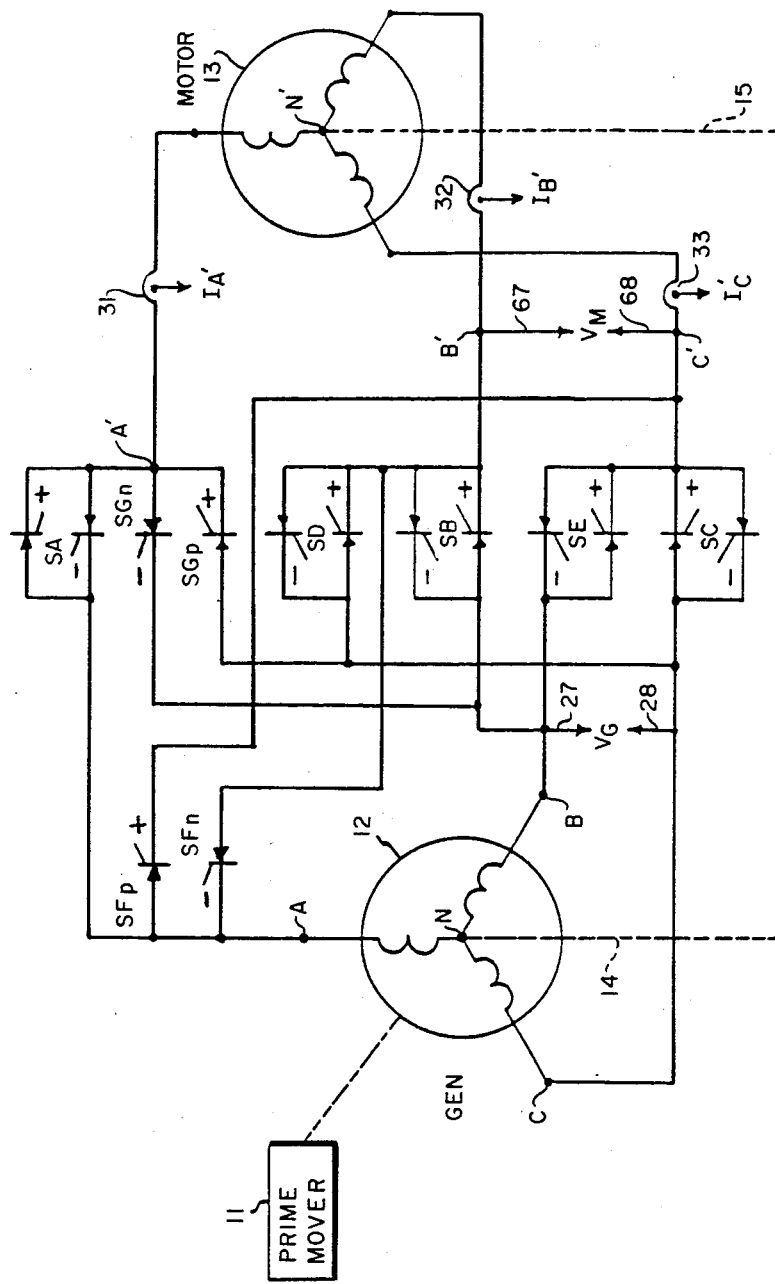
FIG. 1 is a schematic diagram of an electric power circuit comprising a variable speed, 3-phase a-c motor, a 3-phase a-c generator driven by a variable speed prime mover, and a plurality of controllable switches connected between the motor and generator.

The power circuit shown in FIG. 1 comprises a prime mover 11 mechanically coupled to the rotor of a 3-phase a-c generator 12 (sometimes referred to as an "alternator") which serves as a source of alternating voltage to be applied to a variable speed 3-phase a-c motor 13. The fundamental frequency of the voltage at the output of the generator 12 (i.e., the frequency of the fundamental sinusoidal component of the generator's output voltage waveform) is "f" Hertz, and the rms magnitude of this voltage is "v" volts. The magnitude of f depends on the angular velocity (rpm) at which the generator rotor is driven by the prime mover 11.

In the presently contemplated application of the invention, the motor 13 is used to drive the impeller or blades of a centrifugal blower or fan in the air cooling system of a self-propelled traction vehicle such as a diesel-electric locomotive, and in such an environment the prime mover 11 is a variable speed diesel engine. Consequently, both the frequency and the magnitude of the alternating voltage output of the generator 12 are variables. By way of example, in normal operation f can vary in a 4-to-1 range between 26 and 105 Hz, and v will correspondingly vary, with f, in a range between 100 and 402 volts rms. Preferably the generated voltage has a generally sinusoidal waveform.

As is indicated in FIG. 1, the first, second, and third phases of the 3-phase windings of generator 12 are so arranged as to respectively energize three power input terminals A, B, and C the cycle-skipping speed control system of the present invention. A normal phase rotation of A-B-C is herein assumed. The output terminals of the system are designated A', B' and C', and they in turn are respectively adapted to be connected to the corresponding phases of the armature windings of the motor 13 via suitable current transformers 31, 32 and 33 that provide three current feedback signals $I_{A'}$, $I_{B'}$, and $I_{C'}$. By way of example, the motor 13 is a conventional induction type of rotating machine having 3-phase star-connected windings, and it has a rating in a range of approximately 50 to 100 horsepower at full speed when the fundamental frequency of the applied voltage is 105 Hz. A 3-wire power circuit is presently preferred; alternatively, if the invention were used in conjunction with a 3-phase, 4-wire circuit, the source of alternating voltage would include a neutral wire 14, and a conductor (see the broken line 15 in FIG. 1) would be provided to interconnect the neutral wire 14 and the neutral N' of the motor windings.

The input and output terminals of the speed control system are interconnected by means of a plurality of controllable switches. In the illustrated embodiment of the invention, there are five bidirectional and four unidirectional switches. The bidirectional switches include a first switch SA connected between the first input and output terminals A and A', a second switch SB connected between the second input and output terminals B and B', a third switch SC connected between the third input and output terminals C and C', a fourth switch SD connected between the third input terminal C and the second output terminal B', and a fifth switch SE connected between the second input terminal B and the third output terminal C'. The unidirectional switches include a switch SF connected between the first input terminal A and the second output terminal B', a switch SFp connected between the same input terminal A and the third output terminal C', and an extra pair of switches SGn and SGp that are connected between the first output terminal A' and the second and third input terminals B and C, respectively. It will now be apparent that the first three bidirectional switches connect the three source phases to the corresponding motor phases, whereas the fourth and fifth bidirectional switches are arranged to cross-connect the second and third phases of the source and of the motor, respectively, the unidirectional switches SFn and SFp are arranged to connect the first source phase to the second and third motor phases, respectively, and the extra pair of switches SGn and SGp interconnect the first motor phase and the second and third source phases, respectively. If desired, bidirectional switches could be optionally provided in place of the illustrated unidirectional switches SFn and SFp that cross-connect the first source phase with the second and third motor phases, respectively.

Each of the controllable bidirectional switches has a non-conducting state, a positive conducting state in which motor current flows through the switch in one direction (e.g., current flows from the source to the motor), and a negative conducting state in which motor current flows through the switch in the opposite direction (e.g., from the motor to the source). In the preferred embodiment, each such switch comprises at least one inverse-parallel pair of controllable unidirectional electric valves which preferably are solid state controlled rectifiers popularly known as thyristors. Each of the controllable unidirectional switches comprises at least one electric valve, preferably a thyristor, through whch appreciable motor current can flow in only one direction. Each of the illustrated thyristors has a turned on (conducting) state and a turned off (non-conducting) state. As can be seen in FIG. 1, in each switch a plus symbol "+" is associated with the gate or control electrode of the thyristor that is poled to conduct positive motor current, and a minus symbol "−" is associated with the gate or control electrode of the thyristor that is poled to conduct negative motor current.

In order to turn on an individual thyristor in any one of the illustrated switches, an appropriate signal is applied to the associated gate while the main electrodes of that thyristor are forward biased (i.e., anode potential is positive with respect to cathode). Such a signal is sometimes called a trigger or gating signal, and it is herein referred to generically as a "firing signal." Subsequently, due to the periodic reversal of the source voltage polarity, the main electrodes will become reverse biased whereupon the thyristor automatically turns off (i.e., it reverts to its high-resistance, non-conducting, open circuit state) by an "a-c line commutation" process.

Figure 2:
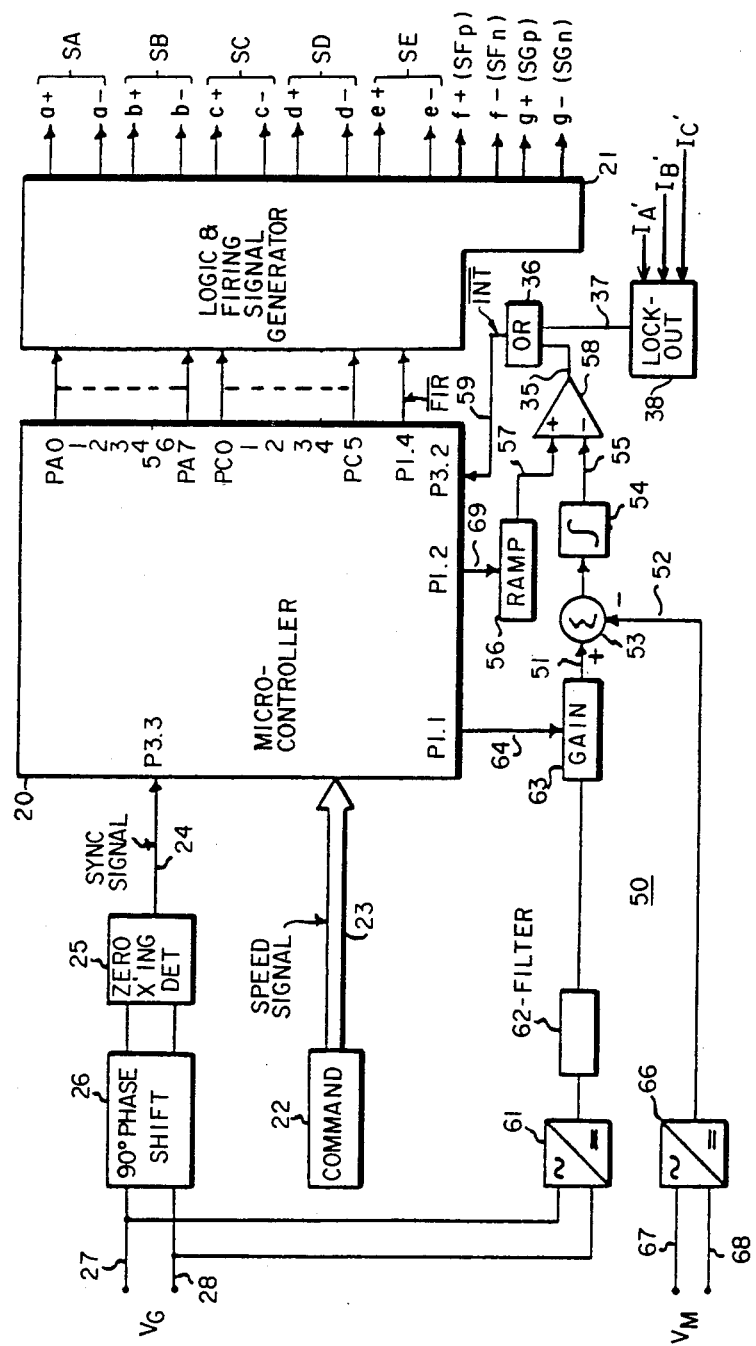
FIG. 2 is a simplified block diagram of control means according to the present invention for producing firing signals which are required to initiate the conducting states of the respective switches shown in FIG. 1.

The firing signals for the controllable switches are supplied by the control means shown in FIG. 2. In a manner that will soon be explained, the control means is effective cyclically to produce, in synchronism with the source voltage, alternative families of periodic firing signals. The particular number, combination and pattern of the firing signals in a family is determined by two factors: whether full motor speed or a fraction 1/N of full speed is desired (N being a predetermined integer such as 2 or 4), and whether a forward or reverse motor direction is commanded.

When the motor 13 is to run at full forward speed, the family of firing signals that is cyclically produced by the control means comprises firing signals for the six thyristors in the three pairs of thyristors that form the first, second, and third bidirectional switches SA, SB, and SC. In FIG. 2 these signals are identified by the reference characters a+ and a− for switch SA, b+ and b− for switch SB, and c+ and c− for switch SC. The control means is suitably arranged so that these six firing signals respectively begin at equal, staggered intervals of approximately 1/6f second, with the signals commencing in the following sequence: b−, a+, c−, b−, a−, c+. This will initiate, in the named sequence, the negative conducting state of the second switch SB, the positive conducting state of the first switch SA, the negative conducting state of the third switch SC, the positive conducting state of SB, the negative conducting state of SA, and the positive conducting state of SC. Note that when operating in this full speed mode, the speed control system does not skip any half cycles of the 3-phase source voltage, the alternating voltage at the output terminals A', B' and C' has the same fundamental frequency (f) as the source voltage, and the motor speed varies with f. If a reverse direction were commanded, the control means would substitute firing signals for the thyristor pair in the fourth bidirectional switch SD (d+ and d− in FIG. 2) for c+ and c−, respectively, and it would substitute firing signals (e+ and e−) for the thyristor pair in the fifth switch SE for b+ and b−, respectively.

When the motor 13 is to run at one-half forward speed, the control means will produce during a cycle of 2/f duration a family of twelve firing signals for the three thyristor pairs that form the first, fourth and fifth bidirectional switches SA, SD and SE, respectively, for the two thyristors that respectively form the positive and negative conducting legs of the second and third bidirectional switches SB and SC, and for the four thyristors that form the individual, unidirectional switches SFp, SGn, SGp, and SFn. The control means is suitably arranged to produce these firing signals in six different sets of two concurrent signals each, with the beginnings of successive sets or pairs of signals being spaced from one another by approximately 1/3f second. More specifically, the firing signal pairs commence in the following sequence: pair a+ and e−, pair b+ and c−, pair a− and d+, pair f+ and g−, pair d− and e+, and pair f− and g+. (As is indicated in FIG. 2, the firing signals f+, f−, g+ and g− will be applied to the thyristor gates of the unidirectional switches SFp, SFn, SGp and SGn, respectively.) This will initiate, in the named sequence, both the positive conducting state of the first bidirectional switch SA and the negative conducting state of the fifth switch SE, both the positive conducting state of the second bidirectional switch SB and the negative conducting state of the third switch SC, both the positive conducting state of the fourth switch SD and the negative conducting state of SA, the conducting states of both of the unidirectional switches SFp and SGn, both the positive conducting state of SE and the negative conducting state of SD, and the conducting states of both unidirectional switches SGp and SFn. Note that when operating in this half-speed mode, the speed control system skips some of the half cycles in each of the three phase-to-phase voltage waveforms of the source, during two consecutive cycles of source voltage the current supplied to each phase of the connected load has a double-pulse waveform (comprising two discrete intervals of positive current, an appreciable gap of zero current, two discrete intervals of negative current, and another zero-current gap), the alternating voltage at the output terminals A', B' and C' has a fundamental frequency of f/2, and motor speed will still vary with f but is one-half what it would be if no half cycles were skipped.

When the motor 13 is to run at one-quarter forward speed, the control means will produce during a cycle of f/4 duration a family of twelve firing signals for the three thyristor pairs that form the first, second and third bidirectional switches SA, SB, and SC, respectively, for the two thyristors that respectively form the negative and positive conducting legs of the fourth and fifth bidirectional switches SD and SE, for the two thyristors that form the individual, unidirectional switches SGp and SGn, and for two additional thyristors (not shown) that respectively form the negative and positive conducting legs of first and second bidirectional switches optionally provided in place of SFp and SFn. The control means is suitably arranged to produce these signals in six different sets of two concurrent firing signals each, with the beginnings of successive sets or pairs of signals being spaced from one another by approximately 2/3f second. More specifically, the firing signal pairs commence in a sequence that will initiate. in the named order, both the positive conducting state of the first switch SA and the negative conducting state of the second switch SB, both the conducting state of the unidirectional switch SGp and the negative conducting state of the first optional switch (SFp), both the positive conducting state of SB and the negative conducting state of the third switch SC, both the conducting state of the unidirectional switch SGn and the positive conducting state of the second optional switch (SFn), both the positve conducting state of SC and the negative conducting state of SA, and both the positive conducting state of the bidirectonal switch SE and the negative conducting state of the bidirectional switch SD. Note that when operating in this quarter-speed mode, the speed control system skips some of the half cycles in each of the three phase-to-phase voltage waveforms of the source, during four consecutive cycles of source voltage the current supplied to each phase of the connected load has a symmetrical, double-pulse waveform, the alternating voltage at the output terminals A', B' and C' has a fundamental frequency of f/4, and the motor speed still varies with f but is one-quarter what it would be if no half cycles were skipped.

It will now be apparent that for each fractional speed of the motor 13 there is a particular number and combination of pairs of firing signals that characterize the family of periodic firing signals produced by the control means. In the presently preferred embodiment of the invention, the firing signal patterns are determined by a microcontroller which is represented by a single block 20 in FIG. 2. Persons skilled in the art of microcomputers will understand that the microcontroller 20 is actually a coordinated system of commercially available microcomputer components and associated electrical circuits and elements that can be programmed to perform a variety of desired functions. By way of example, the system includes an Intel 8031 microprocessor, an Intel 2764 EPROM, an Intel 8255 programmable peripheral interface, and several other related peripheral components.

As is indicated in FIG. 2, the microcontroller 20 receives three input signals, referred to as a synchronizing (SYNC) signal, a speed command signal, and an interrupt (INT) signal, respectively, and it is operative to produce output signals at certain ports PA0 through PA7, PC0 through PC5, P1.1, P1.2, and P1.4. Each output is in the form of a bistable digital signal that is either low ("0") or high ("1") with respect to a predetermined electrical reference level. The ports PA0 through PA7, PC0 through PC5, and P1.4 are in turn connected to a circuit 21 which includes suitable logic means and signal processing means for selectively generating the aforesaid firing signals. The circuit 21 is operative to produce the firing signals for the bidirectional switches SA, SB, SC, SD and SE in the manner disclosed in the previously referenced patent of T. D. Stitt. It is also effective to produce the firing signal f+ for the unidirectonal switch SFp only if and when there are concurrent "0" output signals at ports PC2 and P1.4 of the microcontroller 20, to produce the firing signal f— for the switch SFn only if and when there are concurrent "0" output signals at ports PC3 and P1.4, to produce the firing signal g+ for the switch SGp only if and when there are concurrent "0" output signals at ports PC4 and P1.4, and the firing signal g— for the other switch SGn only if and when there are concurrent "0" output signals at ports PC5 and P1.4. (If the optional bidirectional switches were used in place of SFp and SFn, respectively, the microcontroller 20 and circuit 21 would be suitably arranged to provide firing signals for the two additional thyristors.)

The speed command input signal for the microcontroller 20 is provided by an externally controlled command means 22 which is connected, via a multi-line bus 23, to the microcontroller. This signal is suitably encoded to indicate whether full forward speed, full reverse speed, half forward speed (N=2), quarter forward speed (N=4), or zero speed is desired.

The SYNC signal is supplied to an input port 3.3 of the microcontroller 20 over a line 24 from a zero-crossing detector 25 which is coupled to terminals B and C (FIG. 1) via a phase shift circuit 26 and two lines 27 and 28. The circuit 26 includes an integrator which advances the phase of its output voltage by approximately 90 electrical degrees with respect to the single-phase alternating voltage $V_G$ between terminals B and C, and due to this integrating process any irregularities or "notches" in the generally sinusoidal waveform of $V_G$ are eliminated from the alternating voltage waveform that is applied to the zero-crossing detector 25. The detector 25 changes state each time the instantaneous magnitude of its input voltage crosses zero, whereby the signal at its output alternates between high ("1") and low ("0") levels. Thus the SYNC signal is a "square wave" that corresponds both in frequency (f) and in phase with the fundamental component of $V_{AN}$ (i.e., the phase A-to-neutral N voltage of the 3-phase alternating voltage source). In other words, the single-phase square wave (SYNC) signal that is fed to the microcontroller on the input line 24 is synchronized with the source voltage.

Figure 3:
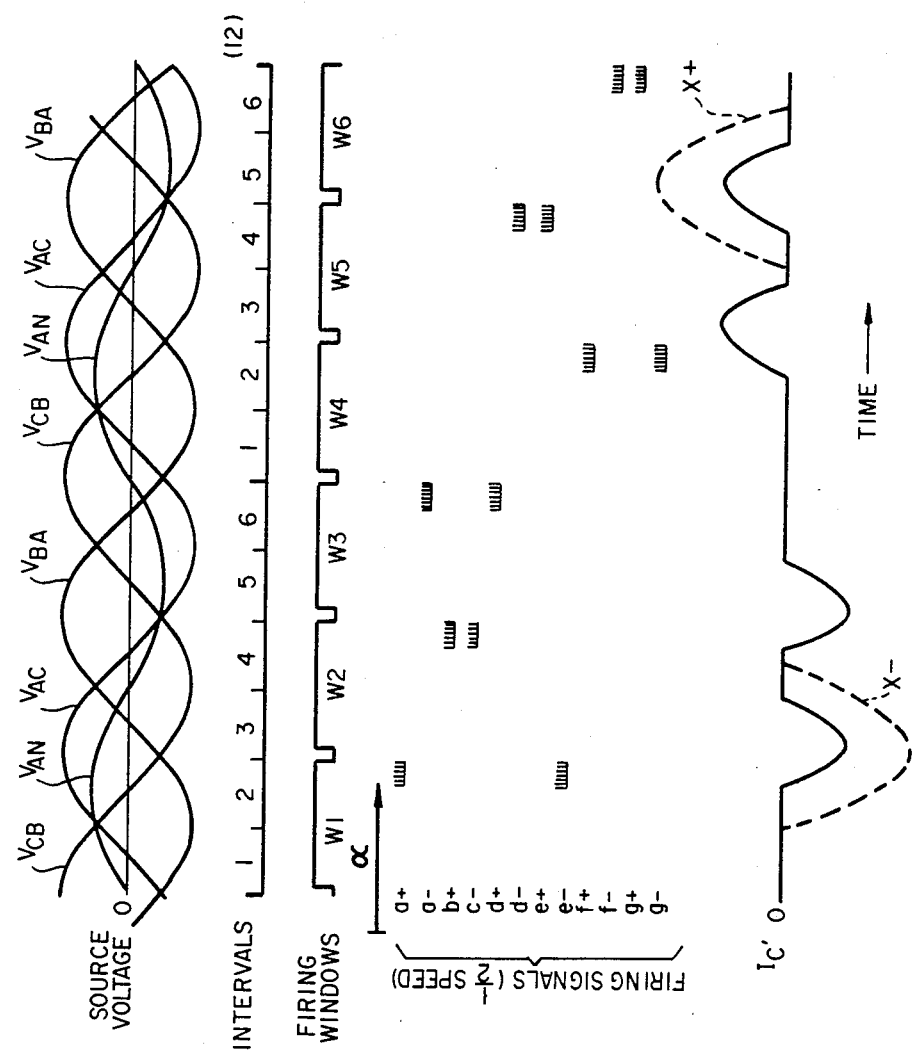
FIG. 3 is a time chart showing the family of firing signals that the FIG. 2 control means will produce at half speed and also showing the waveform of the resulting current in motor phase C during two consecutive cycles of generator voltage.

The fundamental components of the respective phase-to-phase voltages $V_{AC}$, $V_{BA}$, and $V_{CB}$ of the 3-phase variable frequency a-c source are shown in FIG. 3 for two consecutive whole cycles of $V_{AN}$. As noted above, $V_{AN}$ and the SYNC signal are in phase with one another. The SYNC signal is used to trigger certain synchronizing and timing functions in the microcontroller 20. In the presently preferred embodiment of the microcontroller, its components are suitably interconnected and programmed to perform these functions in the manner that will now be briefly described. For a more complete description, see the referenced patent of T. D. Stitt (U.S. Pat. No. 4,461,985).

The microcontroller 20 includes means for converting the periodic 0-to-1 transitions of the SYNC signal on line 24 into a train of very short-duration timing pulses having a frequency of f, and means including an interval counter for producing a series of six interrupts per cycle of the SYNC signal. The first interrupt in each series coincides with a 0-to-1 transition of the SYNC signal on the line 24, and the next five interrupts are each spaced from the immediately preceding interrupt by a base interval that is one-sixth of the average length of the period between successive timing pulses. In other words, there is a set of six consecutive intervals or states of substantially equal lengths between successive timing pulses, and the duration of each such interval is approximately 1/6f. The six intervals have been shown and numbered in FIG. 3 for each of two consecutive cycles of $V_{AN}$. It will be observed that they are respectively concurrent with successive 60-degree segments of the source voltage waveform.

The various components of the microcontroller 20 and of the logic and firing signal generator 21 that are shown in block form in FIG. 2 are suitably interconnected and programmed to respond to a full forward speed command by producing, during each cycle of the SYNC signal on the line 24 and in synchronism therewith, a family of six firing signals a+, c−, b+, a−, c+, and b− which respectively commence, at intervals of approximately 1/6f, in the named sequence. Under steady state full speed operation, the control means preferably will produce the firing signal a+ concurrently with intervals 1, 2 and 3 while it will produce the complementary firing signal a− concurrently with intervals 4, 5 and 6. The firing signal b+ is produced concurrently with intervals 3, 4 and 5, while its complementary firing signal b− is produced concurrently with intervals 6, 1 and 2. The firing signal c+ is concurrent with intervals 5, 6 and 1, and the complementary signal c− is concurrent with intervals 2, 3 and 4. In this embodiment, therefore, each full-speed firing signal begins 30 electrical degrees in advance of the zero crossing of the relevant phase-to-phase source voltage, at which time the main electrodes of the associated thyristor are still reverse biased. Consequently, under steady state full speed conditions a thyristor cannot actually turn on when its firing signal commences. The turn on action will be delayed for 30 electrical degrees or longer (due to the inductive character of the motor load) until the main electrodes become forward biased.

In accordance with the present invention, the control means is further arranged to respond to a half speed (N=2) command signal by performing the following functions:

(1) predetermining the desired combination and pattern of a family of six different pairs of firing signals;
(2) establish a series of recurrent periods synchronized with the square wave signal on the line 24, each period having a duration of approximately 2/f;
(3) preselect six separate portions (windows) of each of the aforesaid periods during which the firing signals can be produced, with only one pair of firing signals being permitted during any one of these windows; and
(4) produce in turn, only during succeeding preselected windows in each period, the aforesaid predetermined pairs of firing signals, with the commencement of each signal being delayed until an interrupt signal that is supplied to port P3.2 is cleared (i.e., until there is a 1-to-0 transition of INT).

For responding to a quarter speed (N=4) command, the control means can be arranged to perform functions similar to the four set forth above (in which case each of the recurrent periods would have a duration of approximately 4/f) and/or to perform the quarter-speed functions as disclosed in the referenced Stitt patent.

FIG. 3 illustrates one of the recurrent periods of 2/f duration that are established when N=2. At half speed each of the recurrent periods comprises two of the aforesaid sets of six 60-degree intervals (for a total of 12 intervals). In other words, each recurrent period comprises 12 consecutive intervals. FIG. 3 also illustrates the six firing windows that the microcomputer is programmed to select in each of the established recurrent periods, and it illustrates the particular pairs of firing signals that are respectively produced during succeeding windows under steady state conditions. More particularly, the first window W1 occurs during the first two intervals when the phase-A-to-phase-B source voltage is positive (i.e., during a negative half cycle of $V_{BA}$ in FIG. 3), and the pair of firing signals a− and e− can be produced at this time. This window has less than a two-interval duration; it actually begins approximately 0.5 millisecond after interval 1 of the first set of intervals commences, and it ends concurrently with termination of interval 2. Thus the first window W1 starts from 35 to 50 electrical degrees after the negative-going zero crossing of $V_{BA}$. The second window W2 occurs during the third and fourth intervals when the voltage of source phase B is positive with respect to phase C (i.e., during a negative half cycle of $V_{CB}$ in FIG. 3), and the pairs of firing signals b+ and c− can now be produced. In practice the window W2 begins approximately 0.5 millisecond after the start of interval 3, and it ends with the termination of interval 4. The third window W3 in the same period occurs during the fifth and sixth intervals when phase C of the source is next positive with respect to phase A (i.e., during the first negative half cycle of $V_{AC}$ in FIG. 3), and the firing signals that can then be produced are a− and d+. In practice the window W3 begins approximately 0.5 millisecond after the start of interval 5 of the first set, and its ending coincides with termination of the next interval 6.

The fourth window W4 occurs during intervals 1 and 2 of the second set of six intervals when the voltage of source phase A is again positive with respect to phase B, and now the pair of firing signals f+ and g− can be produced. In practice this window is delayed approximately 0.5 millisecond after the start of interval 1, and it ends concurrently with termination of the succeeding interval 2. The next window W5 occurs during intervals 3 and 4 of the second set when phase B is next positive with respect to phase C (i.e., during the ensuing negative half cycle of $V_{CB}$ in FIG. 3), and the pair of firing signals e+ and d− can then be produced. This window actually begins approximately 0.5 millisecond after the start of the second interval 3, and it ends with the termination of the next interval 4. The sixth window W6 in the same period occurs during the last two intervals when the voltage of source phase C is once again positive with respect to phase A, and now the pair of firing signals g+ and f− can be produced. Actually the window W6 begins approximately 0.5 millisecond after the start of the second interval 5. The fundamental component of the resulting phase-to-phase alternating voltages across the output terminals A', B' and C' for half speed operation of the 3-phase motor 13 (FIG. 1) has a period of 2/f and a frequency of one-half f.

It will be observed in FIG. 3 that the predetermined pairs of firing signals do not commence until sometime after the respective firing windows begin. The point of time at which each pair actually commences is regulated so that the fundamental component of motor voltage will have substantially the same amplitude-to-frequency ratio at half speed as at full speed. To achieve this result, the control means include a regulator 50 (see FIG. 2) that cooperates with the microcontroller 20 to advance or to retard the start of each pair of firing signals, within the limits of the corresponding firing window, as necessary to minimize any deviation of the rms magnitude of the output voltage from the product of v times a predetermined proportionality constant. As already mentioned, v is the rms magnitude of the source voltage and varies with f. Ideally, as is herein described, the proportionality constant is the fraction 1/N, but in practice it can differ (within reasonable limits) from ideal. Accordingly, this regulating action will ideally maintain constant volts-per-Hertz at the output of the cycle-skipping speed control system when the voltage applied to the connected motor has reduced frequency. The resulting delay in starting each firing signal is shown in FIG. 3 by a line "α" representing a firing angle (in electrical degrees) which is referenced to the immediately preceding zero crossing of the relevant phase-to-phase source voltage. The preferred embodiment of the regulator 50 is shown in FIG. 2 and described and claimed in the prior patent of H. J. Brown and T. D. Stitt (U.S. Pat. No. 4,524,316).

The regulator 50 includes reference means for providing on a line 51 a reference signal representative of the alternating voltage $V_G$ across the input terminals B and C, voltage feedback means for providing on a line 52 a feedback signal representative of the alternating voltage $V_M$ across output terminals B' and C', means comprising a summing junction 53 and an integrator 54 for deriving on a line 55 a control signal representative of any magnitude error between the reference and feedback signals on lines 51 and 52, respectively, bistable ramp generating means 56 for producing on a line 57, when the means 56 is in an active state, a ramp signal of decreasing value, and a comparator 58 which compares the control signal on line 55 with the ramp signal on line 57 and which produces on a line 35 a normally high ("1") output signal that becomes low ("0") whenever the value of the control signal exceeds that of the ramp signal. The output signal on the line 35 provides one input to an OR logic function 36 the other input of which is a bistable digital signal on an output line 37 of a "lockout" circuit 38 that will soon be described. The resulting signal on the output line 59 of the OR logic function 36 is low ("0") only when the output signals of the comparator 58 and of the lockout circuit 38 are both low. The signal on the line 59 is the previously mentioned interrupt signal (INT) that is supplied to the input port P3.2 of the microcontroller 20. As will be explained more fully hereinafter, the microcontroller responds to each 1-to-0 transition of the INT signal by initiating a 0 signal at its output port P1.4.

The aforesaid reference means comprises a full-wave rectifier 61 having an a-c input and a d-c output, an electric filter 62, and an amplifier 63 labeled "gain." As can be seen in FIG. 2, the input of the rectifier 61 is connected to the lines 27 and 28 for energization by $V_G$, and the filter 62 is connected to the rectifier output. Consequently, the magnitude of the output signal from the filter 62 is a measure of the average magnitude of the rectified voltage $V_G$. In practice, the rectifying function and the filtering or averaging function can be advantageously combined in a common circuit that will effectively perform both functions simultaneously. Since the source voltage has a generally sinusoidal waveform, the filter output signal will be substantially proportional to v.

The gain of the amplifier 63 is controlled so that the magnitude of the reference signal on the line 51 varies with the product of 1/N times the average magnitude of the rectified source voltage $V_G$. In other words, the reference signal is representative of v/N. This is simply achieved by selecting a normal amount of gain to provide proper regulator response when the system is operating in a half speed mode, and by switching the gain to a predetermined fraction (e.g., one-half) of its normal amount when operating in a quarter speed mode. To initiate such switching, the amplifier 63 is connected via a line 64 to the output port P1.1 of the microcontroller 20 which issues at this port a signal indicating whether or not the speed command signal on the input bus 23 is calling for one-fourth of full motor speed.

The aforesaid voltage feedback means comprises a full-wave rectifier 66 having an a-c input and a d-c output. Two lines 67 and 68 connect this rectifier input to the output terminals B' and C' (FIG. 1). The line 52 is connected directly to the rectifier output, whereby the unfiltered rectified voltage at the output of the rectifier 66 is applied to the summing junction 53. It will now be apparent that the unipolarity feedback signal on the line 52 has an undulating magnitude that tracks the single phase alternating voltage $V_M$ between output terminals B' and C', and that the resulting error signal at the output of the junction 53 has a ripple frequency of twice the fundamental frequency of $V_M$. The latter signal is fed to the integrator 54 which has a relatively low cross-over frequency and is effective to filter the error signal. The integrator output signal (i.e., the aforesaid control signal on the line 55) therefore has a relatively smooth value that varies with respect to a predetermined base value (e.g., 0 volts) as a function of the time integral of any error between the magnitude of the reference signal on line 51 and the average magnitude of the unfiltered rectified voltage on line 52. So long as there is no such error, the magnitude of the control signal remains constant and can be thought of as a pedestal. If the error were negative (due to the average magnitude of the feedback signal exceeding the magnitude of the reference signal), the control signal magnitude would decrease (i.e., the pedestal would shift toward the aforesaid base value). On the other hand, if the error were positive (due to the average magnitude of the feedback signal being less than the magnitude of the reference signal), the control signal magnitude would increase up to a predetermined maximum (saturation) value.

The control signal from the integrator 54 is supplied over the line 55 to one input of the comparator 58. The other input of the comparator receives the ramp signal over line 57 from the output of the ramp signal generating means 56. The latter means is in either a quiescent state or an active state. In its quiescent state the output signal of the means 56 has a predetermined constant value which is selected to be approximately the same as the maximum value of the control signal on line 55. On the other hand, whenever the means 56 is active, the value of the output signal declines or ramps down, from its quiescent value toward zero, at a predetermined constant rate.

The ramp signal generating means 56 is so constructed and arranged that it is active only if and when a "1" signal is received on an input line 69 from the output port P1.2 of the microcontroller 20. The microcontroller includes means responsive to the train of timing pulses that are derived from the SNYC signal on the line 24 for producing the activating signal on the line 69 contemporaneously with each of the preselected firing windows in each of the recurrent periods of N/f duration. This causes the means 56 to switch from inactive to active states at the beginning of each window, and the signal at the output of the comparator 58 subsequently changes from 1 to 0 at whatever time the magnitude of the declining ramp signal on line 57 crosses the magnitude of the control signal on line 55 (i.e., when the ramp signal and the control signal have equal values). Thus the magnitude of the control signal determines the time at which the 1-to-0 transition on the line 35 occurs: the higher the control signal, the earlier the transition occurs during each window. Thereafter, the comparator output signal on the line 35 will remain 0 until the end of the window at which point the activating signal on line 69 is cleared, the ramp signal generating means 56 reverts to its quiescent state, the ramp signal on line 57 abruptly rises to its predetermined constant value which is higher than the magnitude of the control signal, and the signal on line consequently changes from 0 to 1.

The second input to the OR logic function 36 is provided by the lockout circuit 38 which is effective, each time the comparator output signal on the line 35 changes from 1 to 0, to delay the resulting 1-to-0 transition of the interrupt signal INT on the line 59 if and while there is current in any of the motor phases. Such delay, when effected, desirably prevents the production of firing signals for initiating the conducting states of any pair of controllable switches (FIG. 1) so long as the previously-conducting pair continues to conduct current, thereby avoiding a potentially harmful current shoot-through condition. The preferred embodiment of the lockout circuit 38 is illustrated in FIG. 4 which will now be described.

Figure 4:
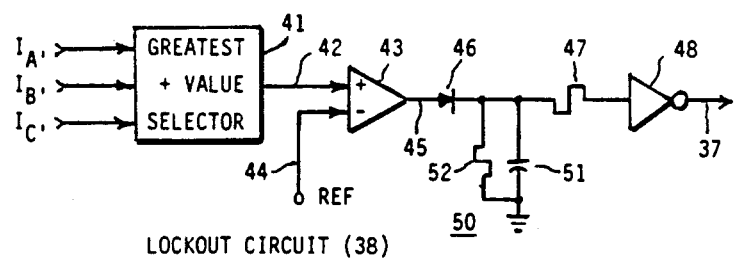
FIG. 4 is a schematic diagram of the lockout circuit shown as a single block in FIG. 2.

As is shown in FIG. 4, the lockout circuit includes a highest value selector 41 that receives the current feedback signals $I_{A'}$, $I_{B'}$ and $I_{C'}$ from the current transformers 31–33 in the respective motor phases (FIG. 1) and that produces, on an output line 42, a signal whose value represents the instantaneous current magnitude in whichever motor phase is conducting a pulse of positive current. (Alternatively, if desired, any two of the current feedback signals could be supplied via full-wave rectifiers to a selector that responds to the greatest absolute magnitude of such rectified inputs.) The output line 42 of the selector 41 is connected to one input of a comparator 43 which compares the actual current-magnitude signal on this line with a reference signal of predetermined constant value on another line 44. The latter value represents a relatively low threshold level of motor current. The signal on output line 45 of the comparator 43 is normally high ("1"), but the comparator is operative periodically, during intervals when the instantaneous magnitude of current in any motor phase equals or exceeds such threshold, to produce a low ("0") output signal.

The line 45 is connected through a diode 46 and a resistor 47 to a polarity inverter 48, and the inverter 48 in turn is connected to the line 37 which is the output of the lockout circuit 38. Thus the signal on the line 37 is high ("1") during intervals substantially concurrent with the current pulses in any of the motor phases and will change from 1 to 0 as soon as the magnitude of current falls below the aforesaid low threshold level as it approaches zero at the end of each pulse. The diode 46 and the resistor 47 are part of a time delay "dropout" circuit 50 that includes a capacitor 51 and another resistor 52 connected in parallel with each other between the juncture of diode 46 and resistor 47 and an electrical reference point of constant potential (e.g., ground). The diode 46 is poled to transfer substantially instantaneously to the input of the inverter 48 a 0-to-1 signal change on the line 45, but when the signal on this line subsequently returns to 0 (due to the rise of the next pulse of motor current) the diode 46 will block discharge current from the capacitor 51 which consequently is effective for a while, as it discharges relatively slowly through a path provided by the parallel resistor 52, to delay the start of the next "0" signal at the inverter input.

It will now be apparent that during each of the successive firing windows the INT signal on the output line 59 of the OR logic function 36 (FIG. 2) will change from 1 to 0 whenever two events occur: (1) the ramp signal on line 57 declines to a magnitude equal to or less than the magnitude of the control signal on line 55, and (2) the motor current has a negligible magnitude (i.e. less than the low threshold set by the reference signal on the line 44 in FIG. 4) or is zero, whichever event occurs last, and INT will subsequently change from 0 to 1, concurrently with the 0-to-1 transition of the signal on the lockout output line 37, in delayed response to the start of the next pulse of motor current that is initiated by the pair of firing signals produced by the firing signal generator 21 in response to the 1-to-0 transition of the INT signal.

Figure 5A:
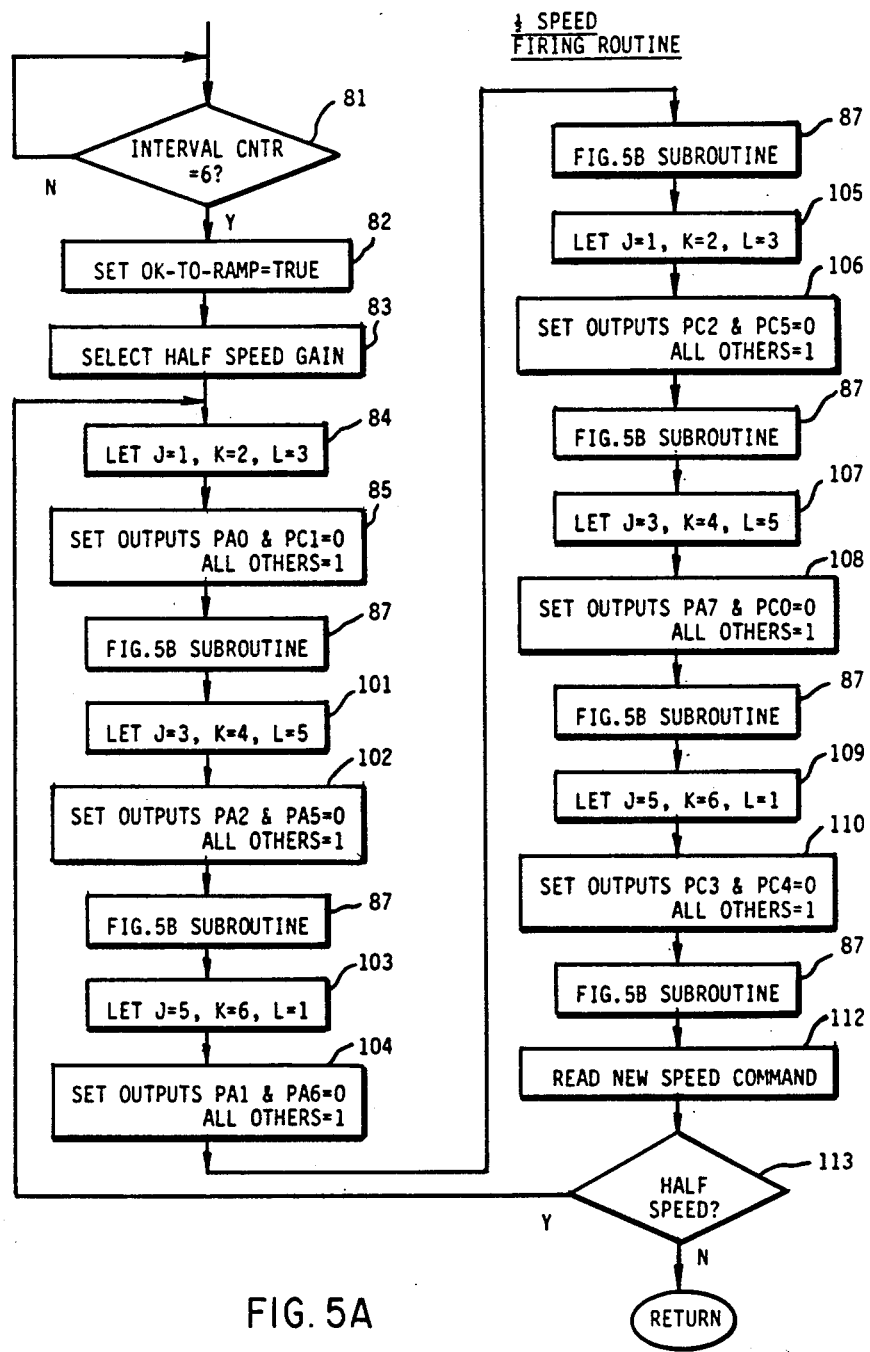
FIGS. 5A and 5B are flow charts that explain the operation of the preferred embodiment of the FIG. 2 control means to produce the firing signal family shown in FIG. 3.
Figure 5B:
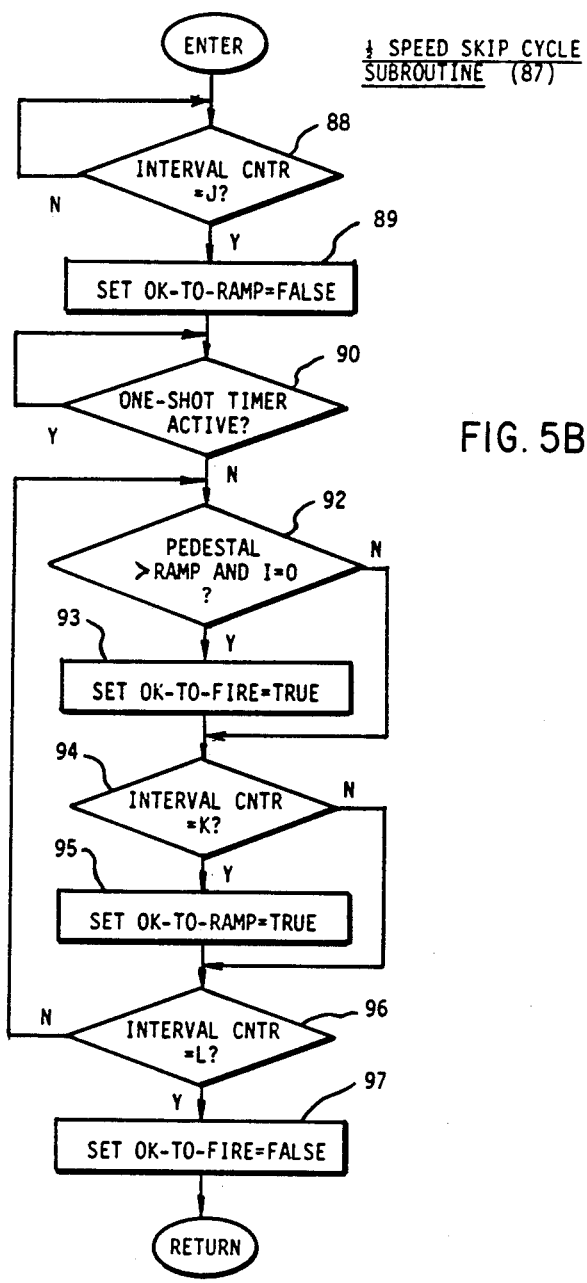

FIGS. 5A and 5B display flow charts of the presently preferred programs that are executed by the microcontroller 20 in order to produce the results already described with reference to FIG. 3. These programs (sometimes referred to as software) control directly the functioning of the microcontroller in the cycle-skipping speed control system of the present invention, and they control indirectly the associated logic means and firing signal generator 21. A Half Speed Firing Routine is shown in FIG. 5A. It begins with an inquiry as to the state of the aforesaid interval counter which is part of the synchronizing and timing functions of the microcontroller 20 (see the description of FIG. 2 above). More specifically, the first illustrated step 81 of this routine looks for interval No. 6. Once the counter advances from interval 5 to interval 6, the next step 82 is executed. (In the flow charts, N stands for no or a negative answer to an inquiry, whereas Y stands for yes or an affirmative answer.) The latter step 82 will change the setting of an "OK-to-ramp" flag from a first or "false" state to another state herein referred to as "true," and this is automatically followed by a step 83 of selecting the desired gain of the aforesaid amplifier 63 in the voltage regulator 50 (FIG. 2). As was previously explained, the amplifier 63 is connected via line 64 to the microcontroller out- put port P1.1. The desired gain for half speed operation is achieved, for example, when there is no "1" signal at the port P1.1, and the step 83 is effective to clear this signal.

In the next step 84 of the Half Speed Firing Routine, three temporary registers of the microcontroller (referred to as selectable states "J", "K" and "L") are loaded, respectively, with the numbers 1, 2 and 3 in binary form. Then, in the following step 85, the signals at the output ports PA0 and PC1 of the microcontroller are set at low levels while the signals at all of the adjacent ports PA1 through PA7, PC0, and PC2 through PC5 are high. The control now enters a Half Speed Skip Cycle Subroutine 87.

The Half Speed Skip Cycle Subroutine 87 comprises the series of steps that are shown in FIG. 5B. The first step 88 inquires as to the state of the interval counter, and more specifically it looks for interval "J" which, for the first pass through this subroutine, is interval 1. As soon as the counter advances from interval J-1 to interval J, a "one-shot" timing function is initiated in the microcontroller 20 and the subroutine proceeds to the next step 89. (The one-shot timing function becomes active each time the interval timer produces a interrupt while the OK-to-ramp flag is true, and when active it is effective to maintain a low or "0" signal at the output port P1.2 of the micro-controller.) The step 89 will return the OK-to-ramp flag to its false state, and this is followed by an inquiry 90 to determine whether or not the one-shot timing function is active. The latter function, once initiated, will remain active for only a predeter- mined short period (e.g., 0.5 millisecond) that is longer than the time required to reset the ramp signal generating means 56 in the voltage regulator 50 (FIG. 2) and to execute the various steps of the Half Speed Firing Routine (FIG. 5A) between successive passes through the subroutine 87. At the end of this active period, the signal at the output port P1.2 will automatically change from "0" to "1." As was previously explained, the port P1.2 is connected via line 69 to the ramp signal generating means 56. A 0-to-1 transition of the signal on the line 69 initiates the active state of the generator 56 and consequently marks the beginning of the first firing window W1 (FIG. 3). Preferably the ramp activating signal on the line 69 is actually produced in the manner described in the referenced Stitt patent, except for the addition of the above-described one-shot timer that delays the 0-to-1 change at the microcontroller output port P1.2 for a predetermined fixed period of time (e.g., 0.5 millisecond) following the next interrupt to be produced after the OK-to-ramp flag is set in its true state.

Upon expiration of the active period of the one-shot timing function, the Half Speed Skip Cycle Subroutine 87 proceeds from the inquiry 90 to a second inquiry step 92 which performs the same functions as the comparator 58 (FIG. 2) and the lockout circuit 38 (FIG. 4). More particularly, the inquiry step 92 determines whether or not (1) the value of the control signal on the line 55 (i.e., the "pedestal") equals or exceeds the declining value of the ramp signal on the line 57, and (2) the actual magnitude of motor current (I) is less than the low threshold level determined by the reference signal on the line 44 (see FIG. 4). If both of these two conditions are true, a step 93 is executed to change the setting of an "OK-to-fire" flag from a first or "false" state to a different state herein referred to as "true." When the OK-to-fire flag is in its true state a train of high-frequency low ("0") signals is produced at the output port P1.4 of the microcontroller 20. Such a train is hereinafter referred to as a firing enable (FIR) signal. Preferably each pulse in this train has a relatively short, constant width of approximately ten microseconds, and the pulses recur at a high frequency of approximately 10 KHz. At the same time the OK-to-fire flag is set in its true state, there is a 1-to-0 transition in the interrupt (INT) signal that the OR logic function 36 supplies over the line 59 to the input port P3.2 of the microcontroller (FIG. 2). In response to such a transition, the microcontroller immediately initiates a low signal of short duration (e.g., approximately 10 microseconds) at its output port P1.4 and then, in effect, disables the INT signal. Both the initial "0" pulse of short duration and the constant frequency FIR signal are preferably produced in the manner described in the referenced Stitt patent, except that the aforesaid one-shot timing function is effective, when active, to inhibit the production of any 0 signal at the output port P1.4.

After the step 93, or immediately after the preceding inquiry 92 so long as the answer thereto is negative, the subroutine 87 proceeds to another inquiry step 94 which looks for interval "K" in the interval counter. K is the interval immediately following J, and it equals 2 for the first subroutine 87 of the Half Speed Firing Routine. If the counter were in this interval, the subroutine would proceed from inquiry 94 to yet another inquiry step 96 via a step 95 that sets the OK-to-ramp flag in a true state again; otherwise it proceeds directly from the step 94 to the step 96. The interrupt produced by the interval counter as it advances from interval J (=1) to interval K (=2) will *not* initiate the aforesaid one-shot timing function, because the OK-to-ramp flag was returned to a false state by the step 89 at the beginning of the interval J.

The inquiry step 96 of the subroutine 87 looks for interval "L" in the interval counter. L is the interval immediately following K, and it equals 3 for the first Half Speed Skip Cycle Subroutine. Throughout the period of time from a negative answer to the inquiry step 90 (i.e., the beginning of a firing window) to the beginning of interval L (=3), the answer to the inquiry 96 will be negative, and the inquiry steps 92, 94 and 96 of this subroutine are automatically repeated in turn. However, as soon as the interval counter advances from interval K (=2) to interval L (=3), the "yes" branch of the step 96 activates a step 97 which returns the OK-to-fire flag to its false state (thereby terminating the FIR signal at the microcontroller output port P1.4), and the subroutine 87 now returns to the Half Speed Firing Routine (FIG. 5A). At the same time, the interrupt that the counter produces upon advancing from K to L will again initiate the one-shot timing function in the microcontroller 20 (because the OK-to-ramp flag was set in its true state by the step 95 during the interval K), and the ramp activating signal at the output port P1.2 now changes from 1 to 0. The resulting 1-to-0 transition of the signal on the line 69 deactivates the ramp signal generating means 56 (FIG. 2), thereby causing the generator 56 to reset to its quiescent state and marking the end of the first firing window W1.

As is indicated in FIG. 5A, the steps 101 and 102 that follow the first Half Speed Skip Cycle Subroutine 87 are similar to steps 84 and 85. respectively. But in step 101 the number assigned to the first state "J" equals the number (3) of the last state L in the step 84, and this time the numbers that are assigned to the selectable states "K" and "L" are 4 and 5, respectively. Step 102 sets the signals at the output ports PA2 and PA5 of the microcontroller 20 at low levels while resetting the signals at output ports PA0 and PC1. Next. the Half Speed Skip Cycle Subroutine 87 is entered for a second time. Note, however, that each time the subroutine 87 is entered after the first pass through, the answer to the first inquiry 88 will always be affirmative because interval J is the same as the interval (L) to which the interval counter advanced to mark the end of the preceding pass through. For the same reason, the one-shot timing function will be initiated, after the first pass through, only by the interrupt that coincides with a K-to-L interval transition.

When the control returns from the second Half Speed Skip Cycle Subroutine to the Half Speed Firing Routine, steps 103 and 104 are executed. Step 103 is similar to step 101; it assigns to the first state "J" the number 5 which equals the number of the last state L in step 101, and it consequently assigns the numbers 6 and 1 to the states "K" and "L", respectively. Step 104, which is similar to the step 102, sets the signals at the output ports PA1 and PA6 at low levels while resetting the signals at output ports PA2 and PA5. Then the control reenters the subroutine 87, and after this subroutine is executed for the third time the control is again returned to the Half Speed Firing Routine as shown in FIG. 5A. Now steps 105 and 106 are executed. Step 105 is the same as the step 84. Step 106 is similar to step 104; it sets the signals at the output ports PC2 and PC5 at low levels while resetting the signal at the output ports PA1 and PA6. After re-executing the subroutine 87 for the fourth time, the control returns to steps 107 and 108 of the Half Speed Firing Routine. Step 107 is the same as the step 101. Step 108 sets the signals at the output ports PA7 and PC0 at low levels while resetting the signals at ports PC2 and PC5. After this step the subroutine 87 is entered for the fifth time, and upon returning to the Half Speed Routine two more steps 109 and 110 are executed. Step 109 is the same as step 103, while step 110 sets the signals at the output ports PC3 and PC4 low and resets the signals at ports PA7 and PC0. Once again the Half Speed Skip Cycle Subroutine 87 is entered. After this sixth pass through the same subroutine, the Half Speed Firing Routine proceeds to a step 112 of reading the "new" speed command which is the encoded speed command signal that is then being supplied to the microcontroller on the input bus 23. The next step 113 determines whether or not the new speed command is still calling for half forward speed. If affirmative, the Half Speed Routine is automatically executed again, starting with the step 84 as is indicated in FIG. 5A. Otherwise the control is returned to the main routine (see the referenced Stitt patent).

From the foregoing description of the Half Speed Firing Routine, it will now be apparent that 12 consecutive intervals of the interval counter will elapse while this routine is being executed once. In other words, two cycles of the synchronizing (SYNC) signal that is supplied on the input line 24 to the microcontroller 20 are required to complete one cycle of this routine. FIG. 3 illustrates the six discrete firing windows W1-W6 during one of the recurrent periods of half speed operation. It is only during these periods that the ramp signal on the line 57 can decline from its quiescent value and eventually cross the control signal on line 55. The latter signal, which is the integral of the error signal supplied to the integrator 54 (FIG. 2), is a pedestal; the higher the pedestal, the earlier it is crossed by the ramp during each firing window. Whenever the pedestal equals or exceeds the ramp, the signal from the comparator 58 is 0. If and when there is a concurrent 0 signal from the lockout circuit 38 (indicating zero or negligible motor current), the INT signal at the input port P3.2 of the microcontroller is 0 and the OK-to-fire flag is in its true state. In the manner previously explained, the microcontroller 20 produces a train of high-frequency 0 signals (FIR) at its output port P1.4 only while the OK-to-fire flag is in this state. Firing is disabled by a 1 signal at the port P1.4.

During the first firing window W1 illustrated in FIG. 3, the signals at output ports PA0 and PC1 are low, and therefore the logic and firing signal generator means 21 (FIG. 2) is effective to produce the pair of firing signals a+ and e− concurrently with the FIR signal at output port P1.4. Actually these firing signals will be intermittent, commonly known as "burst" firing, due to the periodic nature of FIR. The point of time at which the burst commences is delayed, with respect to the immediately preceding zero crossing of the phase A-to-phase B source voltage, by the firing angle $\alpha$. (Note that such a zero crossing occurs midway through interval 6.) As previously explained, the firing signals a+ and e− turn on the positive-current thyristor in the first switch SA and the negative-current thyristor in the fifth switch SE, respectively (see FIG. 1). Once turned on, these two thyristors will conduct current until their main electrodes become reverse biased. Due to the inductive character of the motor 13, the latter event can occur during interval 4 which begins 30 electrical degrees after the negative-going zero crossing of the phase A-to-phase B source voltage.

During the second firing window W2 shown in FIG. 3, the signals at the output ports PA2 and PA5 are low and therefore firing signals b+ and c− are produced concurrently with the FIR signal at the output port P1.4. Similarly: during the third firing window W3 the signals at PA1 and PA6 are low and therefore the pair of firing signals a− and d+ are produced concurrently with the FIR signal; during the fourth firing window W4 the signals at PC2 and PC5 are low and therefore the pair of firing signals f+ and g− are produced concurrently with the FIR signal; during the fifth firing window W5 the signals at PA7 and PC0 are low and therefore the pair of firing signals e+ and d− are produced concurrently with the FIR signal; and during the sixth firing window W6 the signals at PC3 and PC4 are low and therefore the pair of firing signals f− and g+ are produced concurrently with the FIR signal.

The above-described pattern of firing signals for the controllable switches arranged as shown in FIG. 1 will cause a double-pulse current waveform in each phase of the a-c motor 13 when the speed reducing control system is operating at one-half full speed. A full cycle of this waveform under steady state conditions is illustrated in FIG. 3 for motor phase C'. Commencing during consecutive windows W1 and W2 with firing signals e− and c−, two discrete pulses of current $I_{C'}$ are conducted in a negative direction by the switches SE and SC, respectively. A half cycle later, commencing during the consecutive windows W4 and W5 with firing signals f+ and e+, two discrete pulses of positive current $I_{C'}$ are conducted by the switches $SF_p$ and SE, respectively. Each current pulse has a duration ("width") equal to or less than 1/3f. Between each pair of consecutive pulses of positive motor current in the motor phase C' and the preceding and succeeding pairs of negative current pulses in the same phase there are appreciable intervals (equal to or greater than 1/3f, and corresponding generally to the windows W3 and W6) of no current. (The current waveform in each of the other two motor phases will be the same as $I_{C'}$ but time shifted or displaced therefrom by one-third of the period of a complete cycle of motor current. More specifically, the second pulse of positive current in phase A' coincides with the first negative pulse of $I_{C'}$, and the first pulse of positive current in phase B' coincides with the second negative pulse of $I_{C'}$.)

In FIG. 3 the broken-line trace x−, x+ represents the single-pulse current waveform in motor phase C' of the cycle-skipping speed control system disclosed in the referenced Stitt patent when operating in a half-speed mode at the same frequency and the same electrical power output as the present invention. It can be observed that the double-pulse waveform is more symmetrical, has a significantly lower peak magnitude, and has a better form factor than the single-pulse waveform. Consequently the improved system at reduced speed will have fewer electrical losses, higher efficiency, and no objectionable second harmonic component of current. Nevertheless, if f were at or near the maximum end of its normal range of variation, the single-pulse half-speed operating mode that is described and claimed in the referenced Stitt patent may still be preferred in order to obtain higher output power which will be limited, in practice, by the current lockout circuit 38 of the present invention.

As was previously mentioned, FIG. 3 is intended to illustrate steady state conditions. Persons skilled in the art will understand that under a transient condition, such as a change from either zero or full speed to half speed operation, if the magnitude of motor inrush current were relatively high the current lockout circuit could inhibit the second pulse of current during each half cycle until the motor current subsides and approaches its steady state level, whereby the improved speed reducing control system would temporarily produce a single-pulse current waveform.

While a preferred embodiment of the invention has been shown and described by way of example, many modifications will undoubtedly occur to persons skilled in the art. The concluding claims are therefore intended to cover all such modifications as fall within the true spirit and scope of the invention.

We claim:

1. A "cycle-skipping" speed control system for a variable speed 3-phase a-c electric motor comprising:
   a. a 3-phase source of alternating voltage having a fundamental frequency of "f" Hertz;
   b. at least three output terminals respectively adapted to be connected to different phases of said motor;
   c. interconnecting means including a plurality of controllable bidirectional switches and a plurality of controllable unidirectional switches connected between said output terminals and different phases of said source, each of said bidirectional switches having a non-conducting state, a positive conducting state in which motor current flows through the switch in one direction, and a negative conducting state in which motor current flows through the switch in the opposite direction, and each of said unidirectional switches having alterative conducting and non-conducting states,
   d. means coupled to said source for providing a train of timing pulses having a frequency that varies with f;
   e. means for providing a speed command signal indicative of whether full motor speed or a fraction (1/N) of full motor speed is desired, where N is a predetermined integer;
   f. control means responsive to said speed command signal for cyclically producing, in synchronism with said timing pulses, a family of periodic firing signals that are effective selectively to initiate the conducting states of said switches, said family comprising six firing signals that respectively commence in a predetermined sequence at approximately 1/6F intervals when full speed is desired, and said control means being arranged, when a predetermined fraction of full speed is desired:
      (1) to predetermine for each desired speed a particular family of six different pairs of firing signals,
      (2) to establish a series of recurrent periods synchronized with said timing pulses, each period having a duration of approximately N/f.
      (3) to preselect for each desired speed six separate portions of each of said periods during which firing signals can be produced, with only one pair of firing signals being permitted during any one of the preselected portions, and
      (4) to produce in turn, during succeeding preselected portions of each period, said predetermined pairs of firing signals, whereby each firing signal in said family is produced at a frequency of f/N Hertz;
   g. said six pairs of firing signals being produced in a pattern that is coordinated with said interconnecting means to cause a double-pulse current waveform in each phase of the motor, said waveform having a fundamental frequency of f/N and comprising two discrete intervals of current in the same direction and an interval of no current during each half cycle thereof.

2. A system as in claim 1, in which said source is an alternating current generator driven by a variable speed prime mover, whereby f is variable.

3. A system as in claim 1, in which the two firing signals that comprise each of said six different pairs of firing signals are produced by said control means concurrently with one another.

4. A system as in claim 1, in which said control means includes means effective during each of said preselected portions of each period for advancing or retarding, as desired, the time at which each of said six pairs of firing signals actually commences.

5. A system as in claim 4, in which said last-mentioned means comprises regulator means for advancing or retarding the time at which each pair of firing signal commences as necessary to minimize any deviation of the rms magnitude of voltage across said output terminals from the product of v volts times a predetermined proportionality constant, where v is the rms magnitude of said source voltage.

6. A system as in claim 1 and further comprising means for providing feedback signals representative of the magnitude of motor current, and in which said control means includes lockout means responsive to said feedback signals and operative periodically to prevent said firing signals from actually commencing during intervals substantially concurrent with current pulses in the respective motor phases.

7. A system as in claim 6, in which said periodically operative lockout means comprises means for comparing the magnitude of actual motor current with a predetermined relatively low threshold level, said lockout means being inoperative whenever motor current is lower than said threshold level.

8. A system as in claim 7, in which said lockout means also comprises means for delaying the start of its operating intervals each time the magnitude of motor current rises above said threshold level.

9. A system as in claim 1, in which (i) N=2; (ii) said interconnecting means includes first, second and third bidirectional switches that respectively connect the three source phases to the output terminals associated with the corresponding motor phases, first and second unidirectional switches that connect a first one of the source phases to the output terminals associated with the second and third motor phases, respectively, third and fourth unidirectional switches that respectively connect the second and third source phases to the output terminal associated with the first motor phase, and fourth and fifth bidirectional switches that cross-connect the second and third phases of the source and of the motor, and (iii) the family of six pairs of firing signals comprises a first pair of firing signals that respectively initiate the positive conducting state of said first bidirectional switch and the negative conducting state of said fifth switch, a second pair of firing signals that respectively intiate the positive conducting state of the second bidirectional switch and the negative conducting state of the third bidirectional switch, a third pair of firing signals that respectively initiate the negative conducting state of said first bidirectional switch and the positive conducting state of said fourth bidirectional switch, a fourth pair of firing signals that initiate the conducting states of both of said second and third unidirectional switches, a fifth pair of firing signals that respectively initiate the positive conducting state of said fifth switch and the negative conducting state of said fourth bidirectional switch, and a sixth pair of firing signals that initiate the conducting states of both of said first and fourth unidirectonal switches.

10. A system as in claim 1, in which said double-pulse current waveform comprises, during each full cycle thereof, two consecutive intervals of motor current in one direction, a first appreciable interval of no current, two more consecutive intervals of motor current in the opposite direction, and a second appreciable interval of no current.

11. A system as in claim 10, in which N=2, each of said intervals of motor current is equal to or less than 1/3f, and each of said first and second intervals is equal to or greater than 1/3f.

12. A system as in claim 1, in which each of said bidirectional switches comprises at least one inverse-parallel pair of controllable unidirectional electric valves, and each of said unidirectional switches comprises at least one such valve.

13. A "cycle-skipping" speed control system for a variable speed 3-phase a-c electric motor comprising:
 a. first, second and third input terminals respectively adapted to be energized by the first, second and third phases of a 3-phase source of alternating voltage having a fundamental frequency of "f" Hertz;
 b. first, second and third output terminals respectively adapted to be connected to the first, second and third phases of said motor;
 c. first second, third, fourth, fifth, sixth, seventh, eighth, ninth, tenth, eleventh, and twelfth controllable unidirectional electric valves each of which has turned off (non-conducting) and turned on (conducting) states;
 d. means for interconnecting said first and second valves in inverse-parallel relationship to one another between said first input and output terminals, with said first valve being poled to conduct positive motor current;
 e. means for connecting said first input terminal to said third output terminal via said third valve which is poled to conduct positive motor current and to said second output terminal via said fourth valve which is poled to conduct negative motor current;
 f. means for interconnecting said fifth and sixth valves in inverse-parallel relationship between said second input terminal and said third output terminal, with said fifth valve being poled to conduct positive motor current;
 g. means for connecting said second input terminal to said second output terminal via said seventh valve which is poled to conduct positive motor current and to said first output terminal via said eighth valve which is poled to conduct negative motor current;
 h. means for interconnecting said ninth and tenth valves in inverse-parallel relationship between said third input terminal and said second output terminal, with said ninth valve being poled to conduct positive motor current;
 i. means for connecting said third output terminal to said first input terminal via said eleventh valve which is poled to conduct positive motor current and to said third input terminal via said twelfth valve which is poled to conduct negative motor current;
 j. means for providing a speed command signal indicative of whether full or one-half motor speed is desired.
 k. means connected to at least two of said input terminals for providing a train of timing pulses having a frequency f; and
 m. control means responsive to said speed command signal for cyclically producing, in synchronism with said timing pulses, a family of periodic firing signals that are effective selectively to turn on said valves, said control means being arranged when one-half full speed is desired to produce during a cycle of 2/f duration a family of six pairs of firing signals for turning on, in the named sequence and spaced in time by approximately 1/3f, both said first and sixth valves, both said seventh and twelfth valves, both said second and ninth valves, both said third and eighth valves, both said fifth and tenth valves, and both said fourth and eleventh valves.

* * * * *